United States Patent
Shorenstein et al.

(10) Patent No.: US 8,464,662 B1
(45) Date of Patent: Jun. 18, 2013

(54) AUTOMATIC HOUSEBREAKING PAD DISPOSAL APPARATUS

(76) Inventors: Brett Shorenstein, New York, NY (US); David Shorenstein, New York, NY (US)

(*) Notice: Subject to any disclaimer, the term of this patent is extended or adjusted under 35 U.S.C. 154(b) by 192 days.

(21) Appl. No.: 13/017,208

(22) Filed: Jan. 31, 2011

Related U.S. Application Data

(60) Provisional application No. 61/337,478, filed on Feb. 4, 2010.

(51) Int. Cl.
*A01K 29/00* (2006.01)

(52) U.S. Cl.
USPC .............................. 119/164; 119/165; 119/169

(58) Field of Classification Search
USPC .......................................... 119/161, 163–170
IPC ....................................................... A01K 29/00
See application file for complete search history.

(56) References Cited

U.S. PATENT DOCUMENTS

| | | | |
|---|---|---|---|
| 3,142,217 A * | 7/1964 | Busse | 83/375 |
| 3,735,735 A | 5/1973 | Noroian | |
| 3,937,182 A * | 2/1976 | Kamimura | 119/161 |
| 4,011,837 A * | 3/1977 | Ksioszk | 119/164 |
| 4,039,299 A * | 8/1977 | Porter et al. | 44/629 |
| 4,050,414 A | 9/1977 | Knochel et al. | |
| 4,376,365 A * | 3/1983 | Moertel | 53/555 |
| 4,502,413 A | 3/1985 | Ponce et al. | |
| 4,949,673 A * | 8/1990 | Yamamoto | 119/169 |
| 5,392,676 A * | 2/1995 | Drury | 83/455 |
| 5,592,900 A * | 1/1997 | Kakuta | 119/164 |
| 6,827,035 B2 * | 12/2004 | Manera | 119/166 |
| 2009/0000556 A1 * | 1/2009 | Matsuo et al. | 119/161 |
| 2009/0241850 A1 * | 10/2009 | Campbell et al. | 119/164 |

* cited by examiner

*Primary Examiner* — David Parsley
*Assistant Examiner* — Thien Thanh Pham
(74) *Attorney, Agent, or Firm* — Goldstein Law Offices, P.C.

(57) ABSTRACT

An apparatus that maintains housebreaking pads for a pet owner, automatically removing and sealing soiled pads and waste and replacing the soiled pad with a clean pad. The apparatus senses when a pet is using a housebreaking pad, and when the pet is finished, removes and seals the pad and the waste automatically, moving the pad into a repository for later disposal and replacing the soiled pad with a clean pad. The apparatus seals the waste and pad with plastic film having low vapor permeability for disposal on a once-daily or less frequent basis. The apparatus minimizes or eliminates odors associated with canine elimination by removing the pads immediately after elimination is completed, and sealing the waste. A control unit, triggered by a sensor, has a single cycle or a multiple cycle operation, operating a motor that rolls the soiled composite pad onto an arbor in the repository.

11 Claims, 10 Drawing Sheets

AUTOMATIC HOUSEBREAKING PAD DISPOSAL APPARATUS

CROSS-REFERENCE TO RELATED APPLICATIONS

This application is a nonprovisional utility application of the provisional patent application, Ser. No. 61/337,478 filed in the United States Patent Office on Feb. 4, 2010 and claims the priority thereof.

BACKGROUND OF THE INVENTION

The invention relates generally to an apparatus that automatically disposes of soiled pet housebreaking pads. More particularly, the invention relates to an apparatus that senses when a pet is using a housebreaking pad, and when the pet is finished, removes and seals the pad and the waste automatically into a repository for later disposal and replaces the soiled pad with a clean pad.

There were approximately 74.8 million pet dogs in the United States in 2008. Thirty-nine percent of all households have a dog with 36% of those households having two or more. These dogs produce a large amount of waste, with a small dog of 30 pounds producing over approximately 200 pounds of solid waste per year. Dogs urinate anywhere from several times per day up to ten times a day for puppies. Owners desire keeping their homes and apartments clean and without offensive odors, so they either "paper" train or condition their pet to eliminate outdoors. Many municipalities discourage outdoor elimination through "pooper scooper" laws. "Paper" training teaches the pet to eliminate in a specific small area of the house where housebreaking pads made from absorbent materials are placed for that purpose.

Housebreaking pads are used for tens of thousands of puppies and dogs around the country. Dog owners, especially in large cities where there may not be yards, generally prefer to "paper" train their pets. Because of work schedules, some owners may not get home to walk the dog on time, so they "paper" train the pet to use the pads to prevent the dog from eliminating indiscriminately in the house or apartment. Many apartment dwelling dogs, especially among the smaller breeds, are "paper" trained exclusively. Whether they are used for housebreaking for puppies or for "paper" training indoor dogs, who will use these pads throughout their lifetime, housebreaking pads are one of the larger expenditures for dog owners.

One major problem that plagues pet owners is the annoyance of replacing soiled pads. Offensive odors from the soiled pads may permeate the household. Owners need to flush the feces down a toilet or place in a sealed container to decrease the odor. Dogs, especially puppies, when stressed sometimes develop the undesirable habit of coprophagia, eating of feces. If the dog develops the habit, the dog owner needs to pick up fecal matter quickly to break the habit. Disposing of the fecal matter and the pads is not only a continual annoyance, but also causes dog owners to bend down multiple times a day, often bothering the lower back and stressing the knees. This is especially burdensome to the elderly, physically handicapped, and blind who have companion, assistance, or guide dogs.

Previously, simple pet waste disposal systems have been developed. These systems generally rely on the owner to manually remove the waste. Others use special sheets for use with a specific kennel or set into a special frame. Still others have tried developing systems that are similar to toilets by providing surfaces for the dogs to excrete on, which are then reused after rinsing either automatically or manually. Most systems involve frequent owner intervention in the cleanup process.

While these units may be suitable for the particular purpose employed, or for general use, they would not be as suitable for the purposes of the present invention as disclosed hereafter.

SUMMARY OF THE INVENTION

It is an object of the invention to produce an apparatus that automatically disposes of a soiled housebreaking pad without a dog owner bending down to the floor. Accordingly, the apparatus automatically removes soiled housebreaking pads into a repository.

It is another object of the invention to produce an apparatus that automatically disposes of a soiled housebreaking pad and replaces a soiled pad with a fresh one without the owner bending down. Accordingly, the apparatus automatically replaces a soiled housebreaking pad with a fresh one from a pack of clean housebreaking pads supplied from a loading drawer.

It is yet another object of the invention to produce an apparatus that automatically disposes of soiled housebreaking pads, allowing the owner more infrequent clean up of soiled pads. Accordingly, the apparatus collects and seals the soiled housebreaking pads into a repository for disposal on a once-daily or less frequent basis.

It is a further object of the invention to produce an apparatus that automatically disposes of soiled housebreaking pads to minimize or eliminate odors associated with canine elimination. Accordingly, the apparatus automatically removes soiled housebreaking pads immediately after elimination is completed, and seals the waste, including any solid excrement, with plastic film with low vapor permeability into a repository.

The invention is an apparatus that maintains housebreaking pads for a pet owner, automatically removing and sealing soiled pads and waste and replacing the soiled pad with a clean pad. The apparatus senses when a pet is using a housebreaking pad, and when the pet is finished, removes and seals the pad and the waste automatically, moving the pad into a repository for later disposal and replacing the soiled pad with a clean pad. The apparatus seals the waste and pad with plastic film having low vapor permeability for disposal on a once-daily or less frequent basis. The apparatus minimizes or eliminates odors associated with canine elimination by removing the pads immediately after elimination is completed, and sealing the waste. A control unit, triggered by a sensor, has a single cycle or a multiple cycle operation, operating a motor that rolls the soiled composite pad onto an arbor in the repository.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
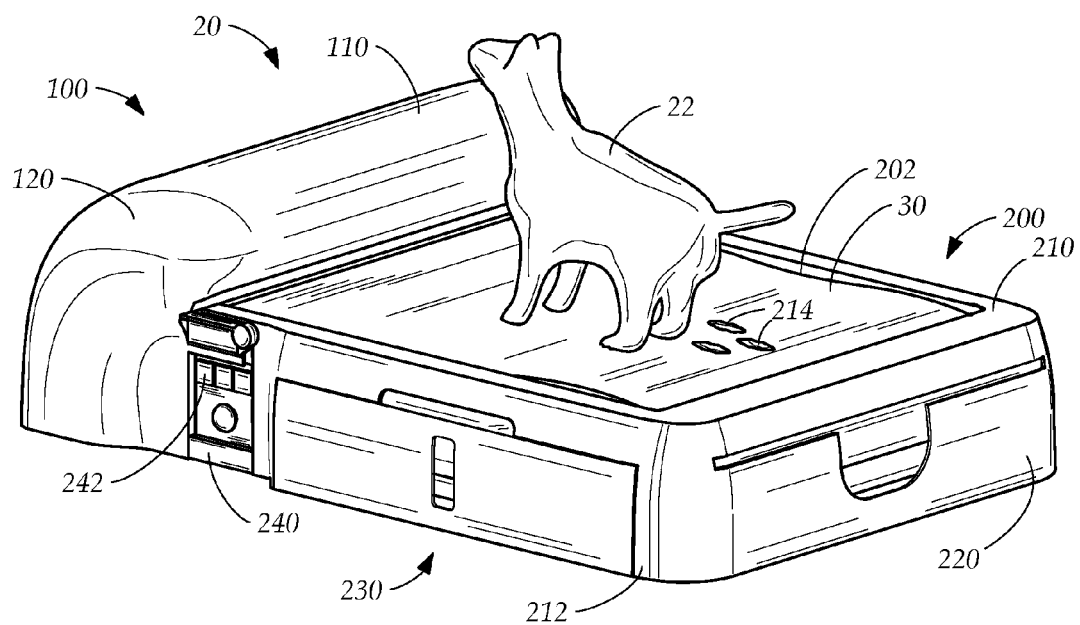
FIG. 1 is a diagrammatic perspective view of the invention demonstrating a pet eliminating on a housebreaking pad.

FIG. 1 illustrates an automatic housebreaking pad disposal apparatus 20 with a pet 22 eliminating solid waste 24 on a housebreaking pad 30. The apparatus 20 detects the pet eliminating 22 and when the pet 22 leaves the apparatus 20, the apparatus 20 automatically cycles the replacing of the soiled pad with a clean pad by removing and sealing the soiled pad and feeding a clean pad from a pack. The apparatus has a stage portion 200 where the pet 22 stands on the housebreaking pad 30, the stage portion 200 attached to a repository portion 100 to where the apparatus 20 removes and seals the soiled pad with a plastic film and stores a sealed pad for later disposal.

The repository portion 100 is aesthetically covered by a cowling assembly 110 to hide the soiled housebreaking pads. The stage portion 200 has a pad stage and the housebreaking pad 30 is set on top of the pad stage 202. The pet 22 stands on the pad stage 202 on top of the housebreaking pad and eliminates feces 24 and urine. The stage portion 200 also has a cover assembly 210 having a front portion 220, and a pair of side panels 212. A loading drawer assembly 230 and a control unit 240 are on a side panel 212.

Figure 2:
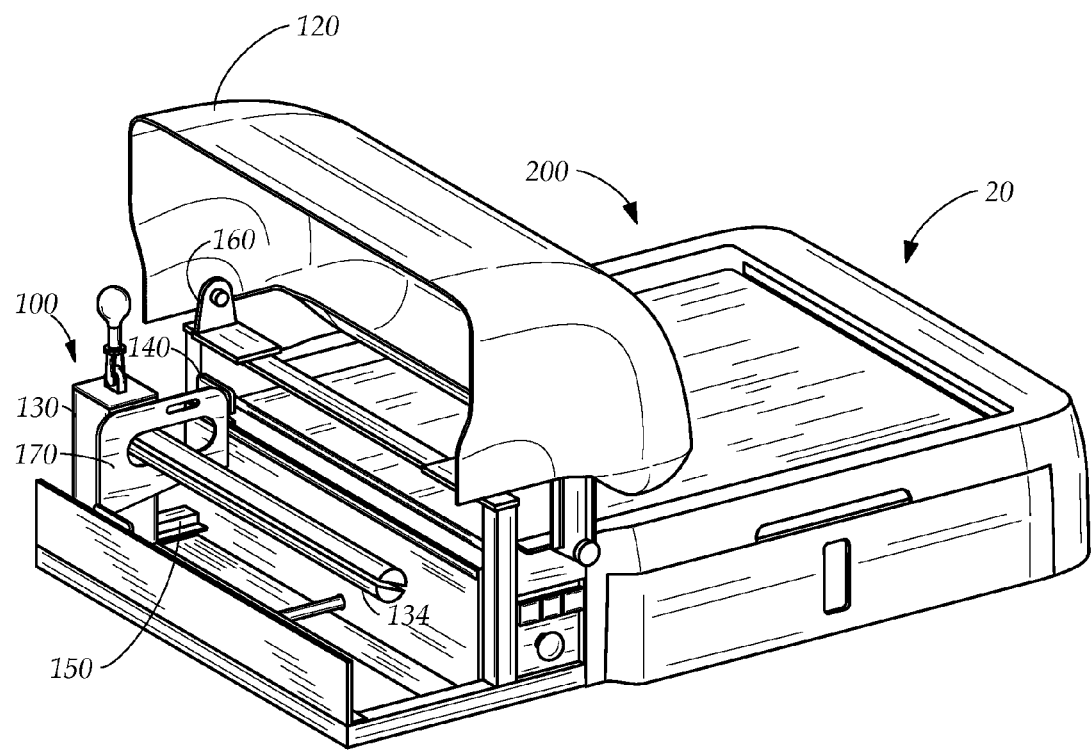
FIG. 2 is a diagrammatic perspective view of the invention with a cowling opened showing a repository portion of the invention.

FIG. 2 illustrates the repository portion 100 with a cowling 120 open, showing a film dispensing assembly 160, an arbor assembly 130, a slide assembly 150, a cutter assembly 140 and a scraper assembly 170. The film dispensing assembly 160 delivers a linear sheet of plastic film having low vapor permeability which clings to the housebreaking pad, sealing the soiled pad and forming a composite pad. The arbor assembly 130 takes up the composite pad, winding the composite pad onto an arbor 134 creating a roll. The slide assembly 150 moves the arbor assembly 130 away from the stage portion 200 as the composite pad roll increases in diameter when more composite pads are added. The cutter assembly 140 slices the composite pad when the roll is ready to be removed, separating the roll from the remaining pad on the apparatus 20. The scraper assembly 170 pushes the roll off the arbor 134 for disposal.

Figure 3:
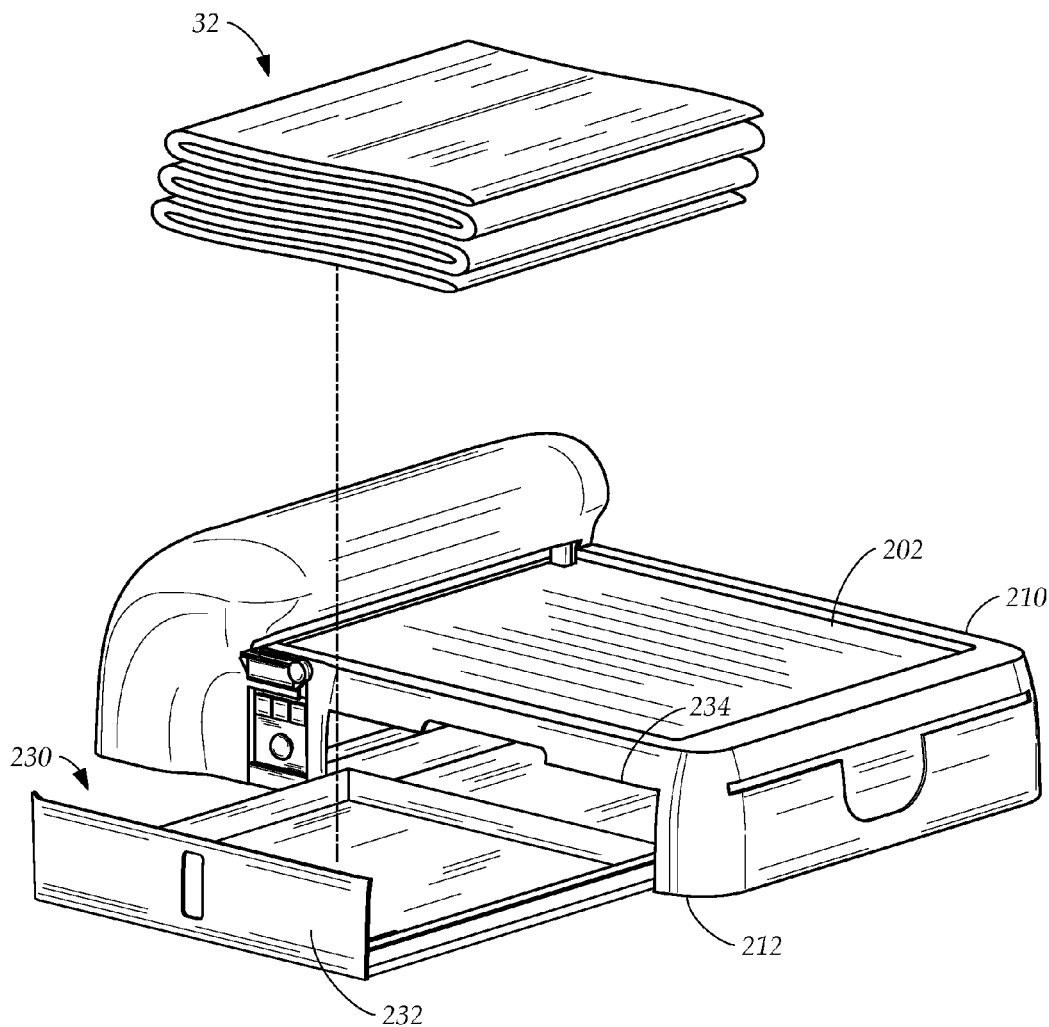
FIG. 3 is a diagrammatic perspective view of the invention with a housebreaking pad pack being installed in a loading drawer.

FIG. 3 shows the loading drawer assembly 230, with an open loading drawer 232, in preparation of loading a pack 32 of housebreaking pads. The side panel 212 has an opening 234 for the drawer 232 to slide in and out of the cover assembly 210. The pads are a continuous length of absorbent material backed with a waterproof layer accordion folded in the pack 32, the pack 32 supplying the clean housebreaking pads to the pad stage 202. When the pads are loaded, the drawer 232 is closed in preparation for further installation of the pads and operation of the apparatus.

Figure 4:
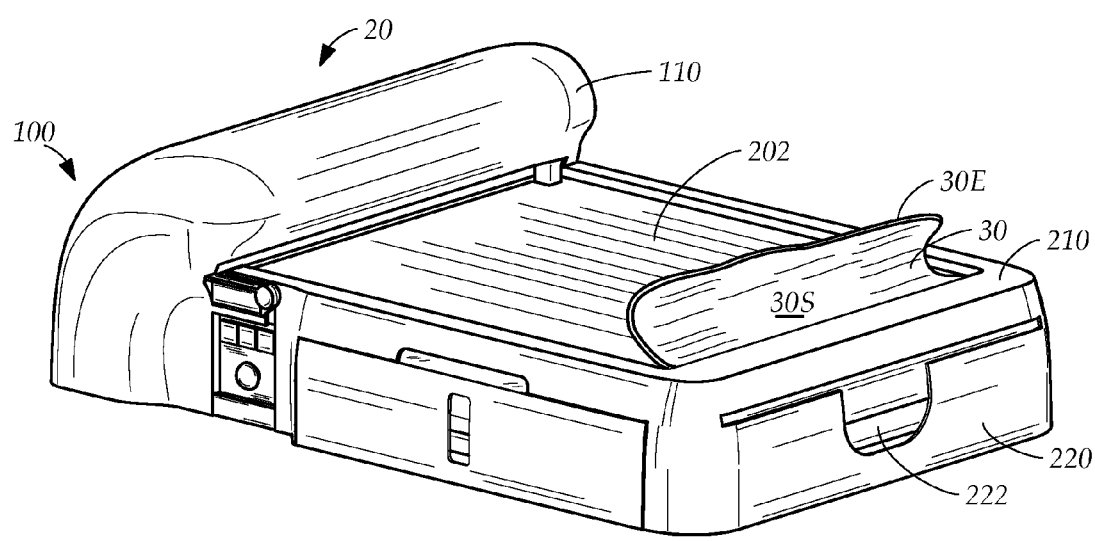
FIG. 4 is a diagrammatic perspective view of the invention with a housebreaking pad being installed on a stage.

FIG. 4 illustrates the next phase of installing the housebreaking pads in the apparatus 20. The front portion 220 of the cover assembly 210 has a portal 222 and there is a slot, which is not shown, between the front portion 220 and the pad stage 202. The pack of pads has a top pad 30 with a leading edge 30E. The pet owner inserts a hand in the portal 222 on the front panel 220 and guides the leading edge 30E of the top pad 30 through the slot. The waterproof side of the housebreaking pad 30 faces the pad stage 202 and the absorbent side 30S is exposed on the pad stage. The pet owner pulls the leading edge 30E over to the attached cowling assembly 110 on the repository portion 100, the pad 30 covering the pad stage 202 for further installation.

Figure 5:
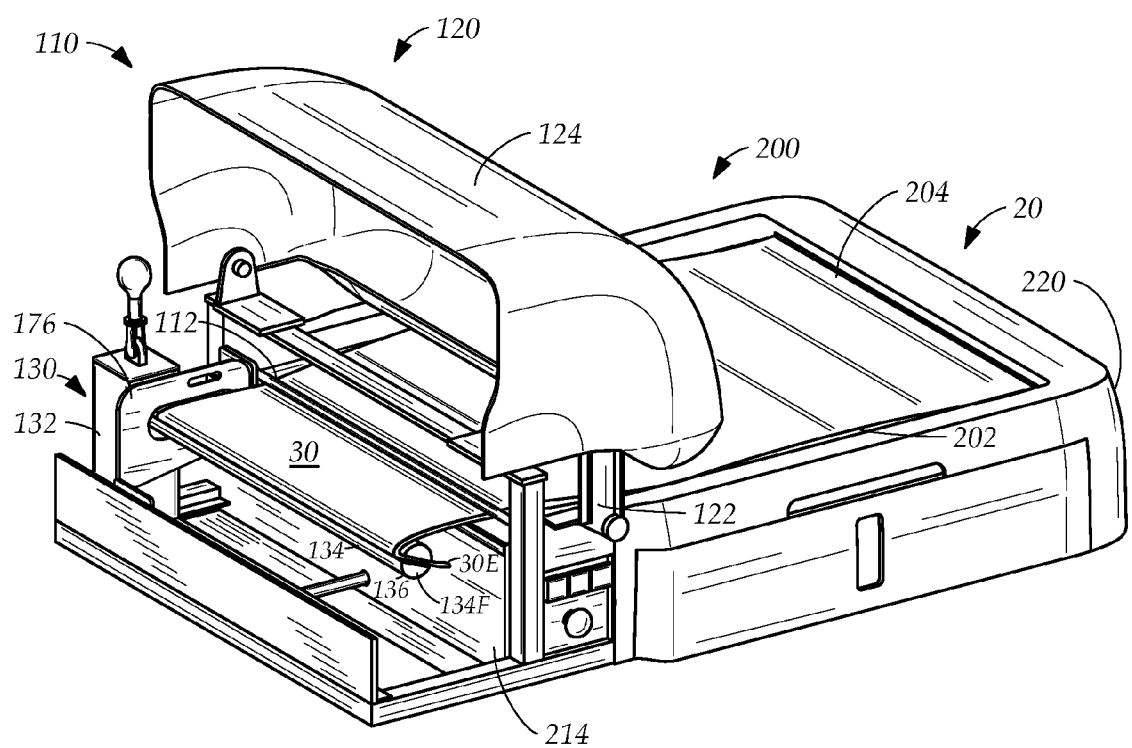
FIG. 5 is a diagrammatic perspective view of the invention with the cowling opened showing the housebreaking pad connecting to an arbor.

FIG. 5 demonstrates the installation of the housebreaking pads 30 in the repository portion 100 of the apparatus 20. The repository portion 100 has the cowling assembly 110 with a cowling frame 122 and the cowling 120, the cowling assembly 110 is attached to the stage portion 200, the stage portion 200, having a back end 214 opposite the front portion 220. The cowling frame 122 is attached adjacent to the back end 214 of the stage portion 200. The cowling 120, having a pair of sides 120S with a curved panel 124 between the sides 120S, is connected to the cowling frame 122 by a pair of hinges, one hinge on each side 120S of the cowling 120. The cowling 120 is shown rotated on the hinges to an open position.

The leading edge 30E of the housebreaking pads 30 is inserted under a guide bar 112 spanning the back end 214 of the stage portion 200 and into the arbor assembly 130. The arbor assembly 130 has the arbor 134 with a longitudinal slot 136 and a pair of ends, a first end 134E attached to a housing 132 containing a motor and a free end 134F. The arbor 134 is slightly longer than the width of the housebreaking pad 30. The leading edge 30E is inserted into the longitudinal slot 136, with the waterproof side facing the arbor 134, in preparation for the installation of the plastic film.

Figure 6:
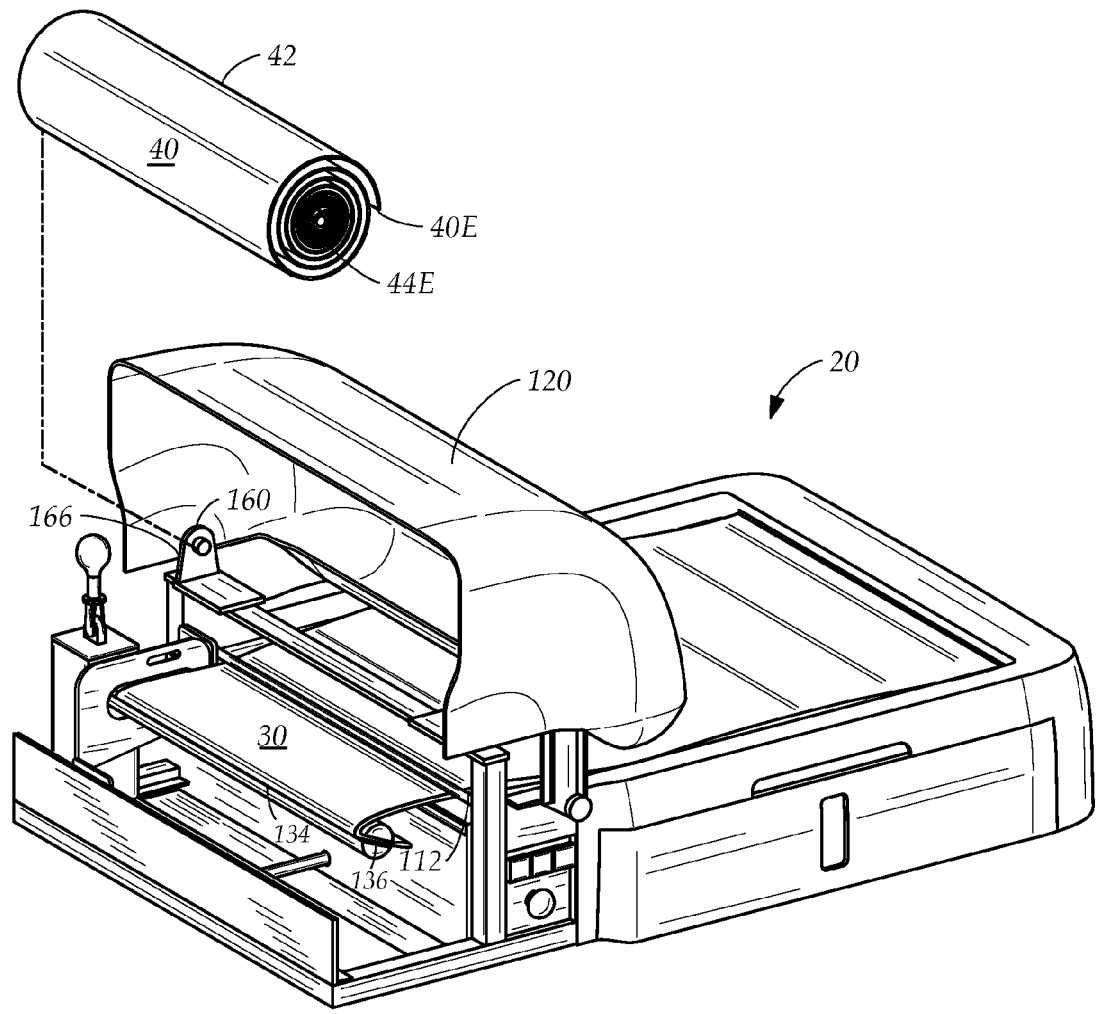
FIG. 6 is a diagrammatic perspective view of the invention with the cowling opened showing the installation of a roll of plastic film.

FIG. 6 shows the further preparation of the apparatus 20. A roll 42 of plastic film 40, having a leading edge 40E, is installed in the film dispensing assembly 160. The plastic film 40 is on a hollow cylinder, having a pair of ends 44E. Inside the cowling 120 are a pair of short axles 166, one on each side of the cowling 120. The plastic film roll 42 mounts on the short axles 166, one short axle 166 inserted in each end 44E such that the plastic film roll 42 freely rotates around the axles 166. The leading edge 40E of the plastic film is inserted under the guide bar 112 and into the slot 136 on the arbor 134 on top of the absorbent side of the housebreaking pad 30. The plastic film 40 is aligned edgewise with the housebreaking pad 30 and the two layers are held on the arbor 134 by a compression spring which is not illustrated. When the two layers are pressed together, the plastic film 40 seals the absorbent layer of the housebreaking pad 30 against the waterproof layer, sealing in odors and waste solids, forming a composite pad. The plastic film 40 has a low vapor permeability, preferably polyvinylidene chloride (PVDC) or PVDC copolymers, as well as other polymers that form thin sheets, such as, for example, but not limited to, linear low density polyethylene and high density polyethylene.

Figure 8:
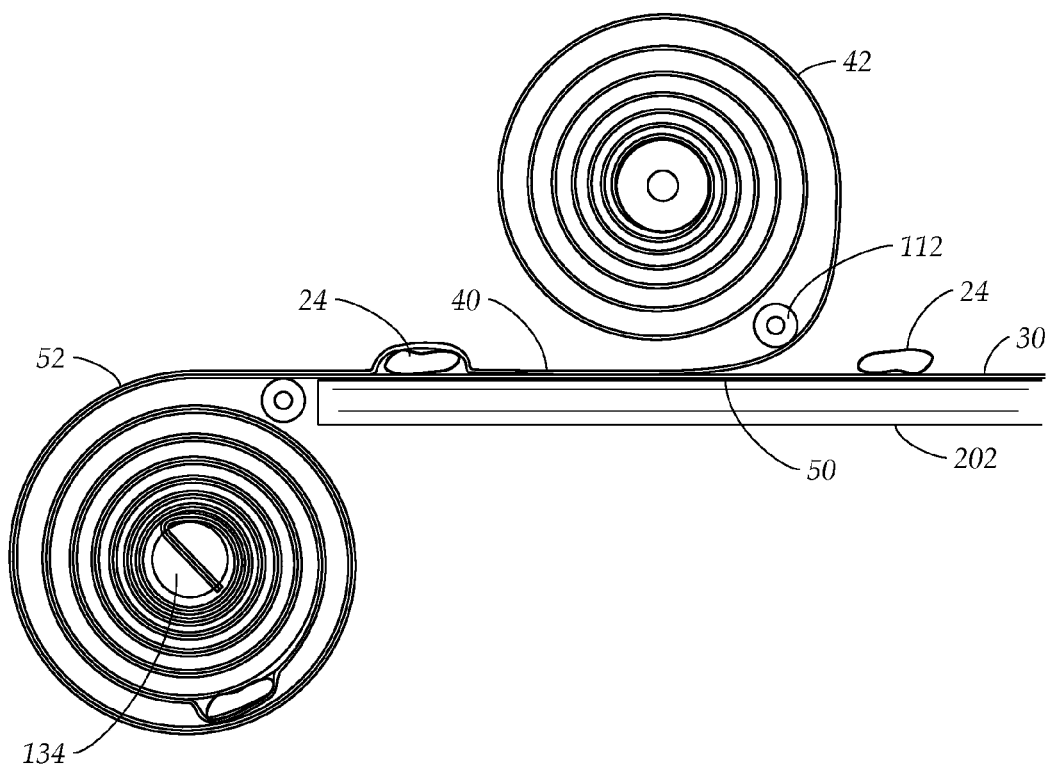
FIG. 8 is a side elevational view of the invention, without the cover assembly and cowling for clarity, of the plastic film on a dispensing roll uniting and sealing with the housebreaking pad and waste, forming a composite pad and the arbor taking up the composite pad.

FIG. 8 shows the composite pad 50 as it is formed without the cowling and cover assembly for clarity. The housebreaking pad 30 sits on the pad stage 202, the waterproof side of the pad 30 facing the pad stage 202. Solid waste 24 as well as liquid waste absorbed into the pad 30 on the absorbent side are moved by rotation of the arbor 134 into the repository portion of the apparatus. The housebreaking pad 30 moves under the guide bar 112 where it is united with and sealed by the plastic film 40 on the roll 42, trapping the solid waste 24, liquid waste and associated vapors between the plastic film 40 and the waterproof side of the housebreaking pad 30, forming 5h3 composite pad 50. The arbor 134 winds the composite pad 50 with the waste 24, forming a roll of 52 layers around the arbor 134 and increasing the arbor diametrally.

Figure 7:
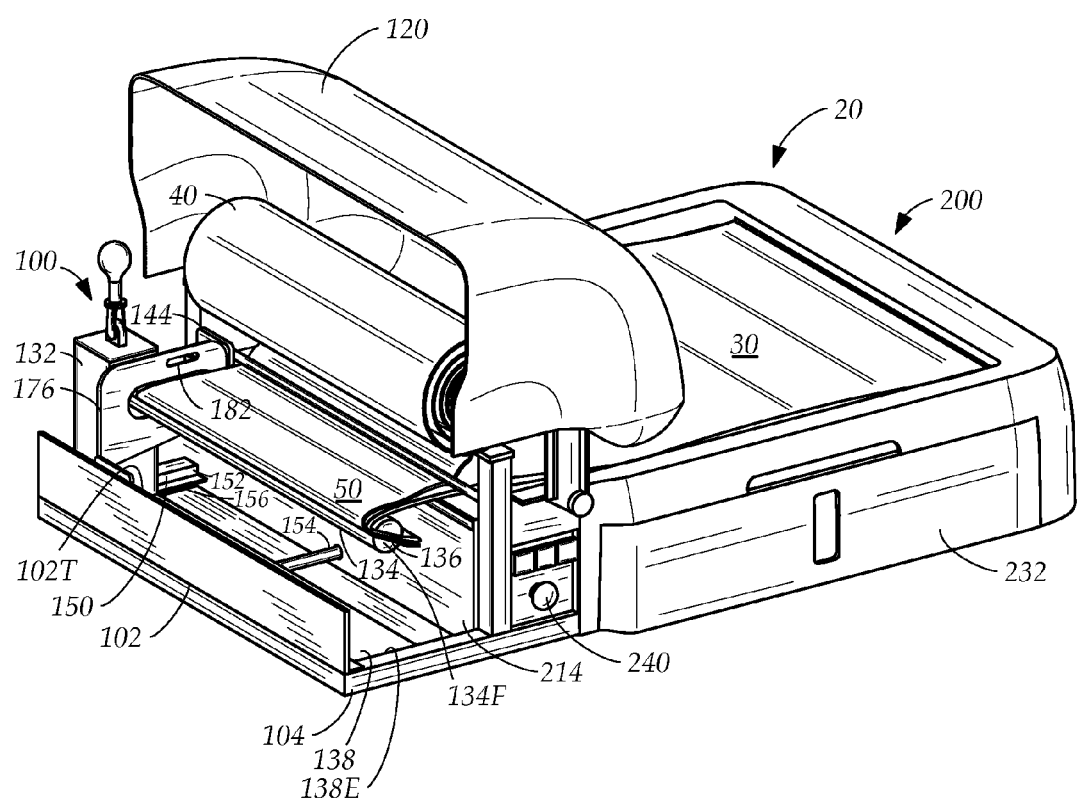
FIG. 7 is a diagrammatic perspective view of the invention with a cowling opened showing the plastic film and housebreaking pad united on the arbor forming a composite pad.

FIG. 7 shows the apparatus 20 loaded with the housebreaking pads 30 and plastic film 40 mounted on the arbor 134, forming the composite pad 50. When the pet owner rotates the cowling 120 in a closed position and the pet owner selects a cycle on the control unit 240, the apparatus is ready for the pet's use. In the repository portion 100, the arbor assembly housing 132 attached to the arbor 134 is mounted on a slat 138 having a center and a pair of short slotted ends 138E. The repository portion 100 has a back panel 102, having a top 102T and center and a pair of short sides 104, connecting the back panel 102 of the repository portion 100 and the back end 214 of the stage portion 200. The short sides 104 have a bottom with a slide assembly 150. The slide assembly has a shaft 154 and a pair of railings 152 on the bottom of the short sides 104, each having a track 156. The slotted ends 138E of the slat 138 are inserted into the tracks 156 of the railings 152. The slat 138 has a center channel. Attached to the center of the back panel 102 is the shaft 154. The shaft 154 is inserted in the center channel of the slat 138 to maintain the alignment of the slat 138 between the railings 152 of the slide assembly 150. At the initial installation of the housebreaking pads 30 and plastic film 40 on the arbor 134, the arbor 134 with the roll 52 of composite pads 50 has a small diameter and is positioned close to the back end 214 of the stage portion 200. As the arbor takes up additional composite pads 50, forming a roll, the roll 52 diametrally increases. As the roll 52 increases, the slat 138 with the housing 132 and arbor 134 moves along the slide assembly 150 away from the back end 214 of the stage portion 200 extending the repository portion 100 to create space for the increasing diameter of the roll 52.

Figure 9:
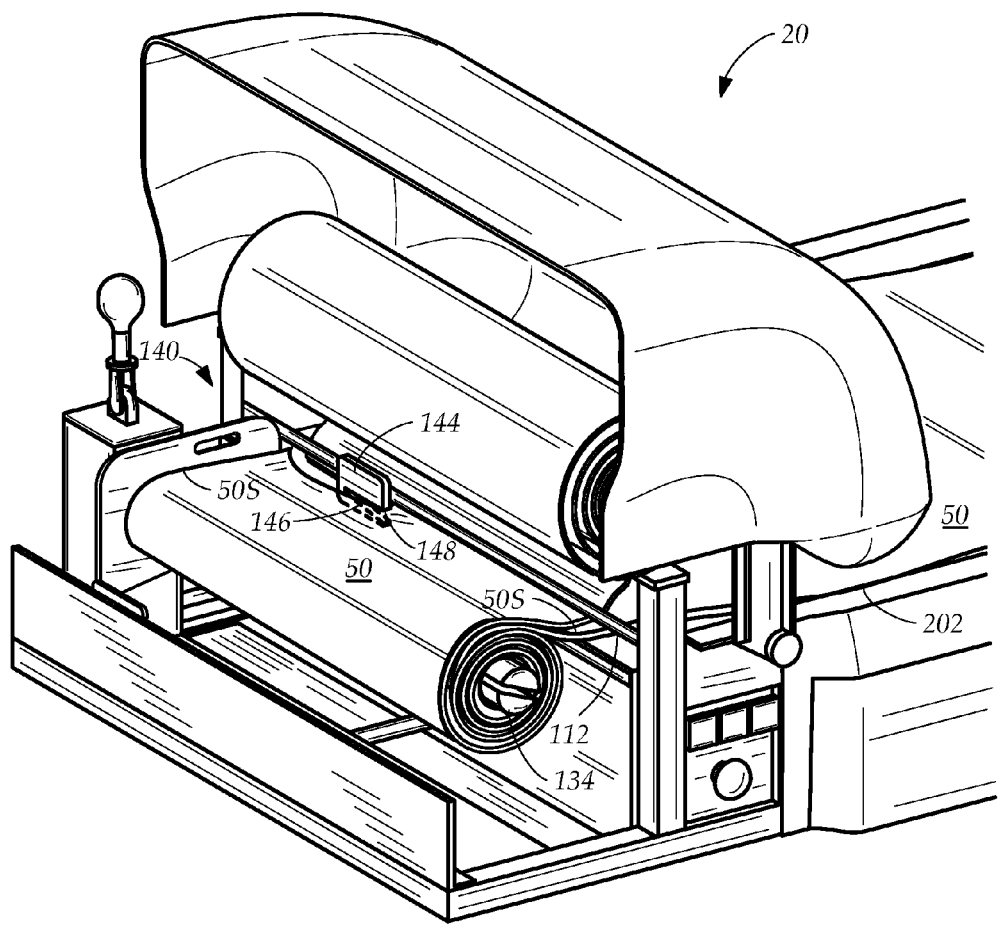
FIG. 9 is a diagrammatic perspective view of the invention with a cowling opened showing a cutter slicing the composite pad, separating the composite pads on the arbor from the pads on the pad stage in preparation for disposal.

FIG. 9 illustrates the cutter assembly 140 slicing the composite pad 50 in preparation for removal from the apparatus 20 and disposal. The cutter assembly 140 is slidably attached to the guide bar 112. The cutter assembly 140 has a cutter 144 and a guide wire inside the guide bar 112. The cutter 144 has a handle 148 with a slit 146 and a protected blade inside the slit 146. The composite pad 50, having a pair of side edges, slips inside the slit 146 at a first side edge 50S of the pad 50, the pad contacting the blade. The cutter 144 traverses the pad to a second side 50S of the pad 50 by the pet owner manually pulling across with the guide wire guiding the cutter 144 or the guide wire is motor driven and pulls the cutter 144 across the pad. The cutter 144 slices the pad 50, disconnecting the composite pad 50 wound on the arbor 134 from the composite pad 50 remaining on the pad stage 202.

Figure 10:
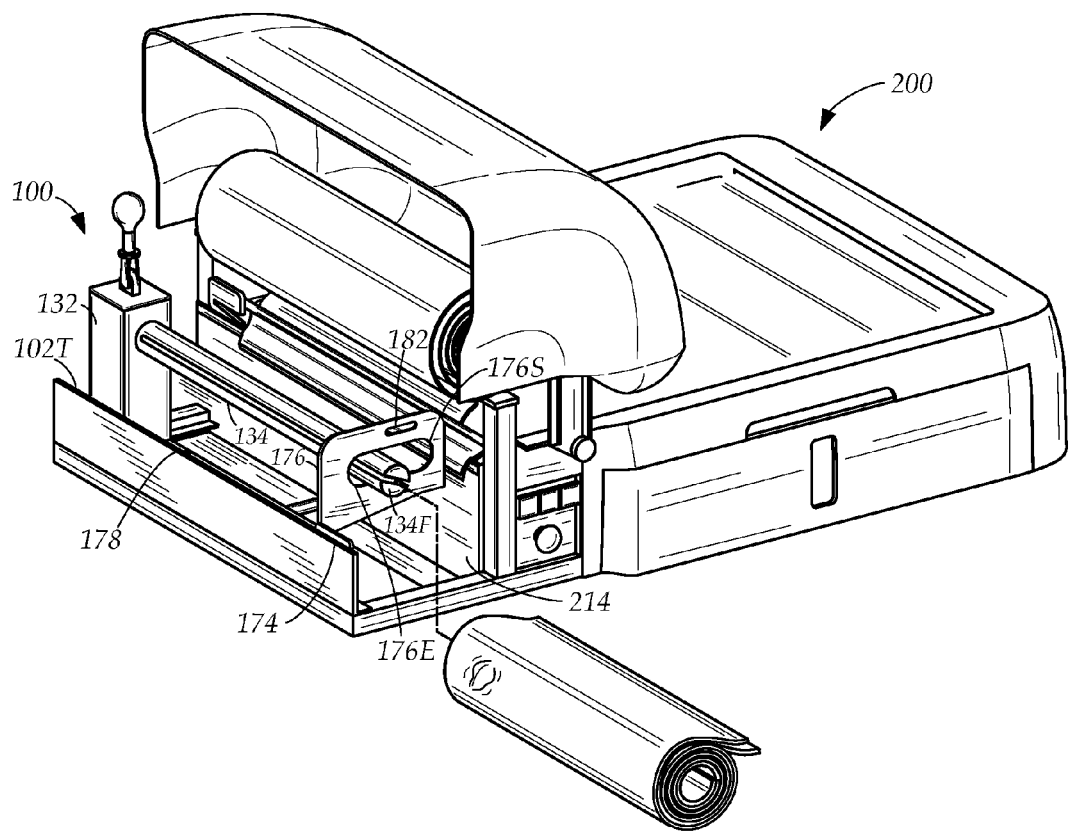
FIG. 10 is a diagrammatic perspective view of the invention with a cowling opened showing a scraper removing the sealed roll from the arbor for disposal.

FIG. 10 shows the scraper assembly 170 in an extended position. When the composite pad 50 has diametrally expanded to a maximum diameter that the repository portion 100 accommodates, or when the pet owner wishes to dispose of the composite pad 50 before the maximum diameter is reached, the composite pad roll 52 is removed from the arbor 134. The scraper assembly 170 has a scraper plate 172 with a bore 176 and a top handle 182, a track 178 attached to the top 102T of the back panel 102 of the repository portion 100, and a guide plate 174. The arbor 134 fits inside the bore 176 of the scraper plate 172. The bore 176 is a horizontal oval with a stage portion end 176S and a back panel end 176E, so that the arbor 134 fits through the bore 176 when the arbor 134 is close to the back end 214 of the stage portion, fitting through the stage portion end 176S of the oval bore 176 when the diameter of the roll 52 on the arbor 134 is at a minimum. When the diameter of the roll 52 on the arbor 134 is at a maximum, the arbor 134 fits through the bore at the back panel end 176E. The scraper plate 176 has a lower corner adjacent to the back panel 102 of the repository portion 100. A guide plate 174 is attached to the scraper plate 176 at a right angle to the lower corner adjacent to the back panel 102 and fits inside the track 178 on the back panel 102. Before the pad 50 is attached to the arbor 134, the scraper plate 176 is pushed along the arbor 134 towards the housing 132, out of the way of the roll. When the pet owner is ready to remove the composite roll 52, the pet owner releases the compression spring holding the composite pad roll 52 on the arbor 134, grabs the top handle 182 of the scraper plate 176 and pulls the plate 176 towards the free end 134F of the arbor, disengaging the composite roll 52 from the arbor by sliding the roll off the arbor 134. The slide plate 176 in the track 178 gives the pet owner leverage and keeps the scraper plate 176 aligned to maximize the force applied to the roll 52.

Referring again to FIG. 1, once the housebreaking pads and plastic film are installed and the cowling 120 is in the closed position, the apparatus 20 is ready for use. The pet owner plugs the apparatus 20 into an electrical outlet. The apparatus is ready for a disposal cycle. The user selects the desired cycle on the control unit 240. The control unit 240 has a panel having a plurality of control buttons 242 that includes jog start, automatic cycle, restart and stop. The stop button is for an emergency stop. In the illustration, the control unit 240 and the drawer assembly 230 are conveniently located on the same side panel 212, but this is not a limitation, and it is possible to place the control unit 240 and the drawer assembly 230 on opposing panels.

The apparatus 20 has a sensor for detecting the presence of a pet 22 on the pad stage 202. The sensor is, for example but not limited to, a load cell to detect change in weight, or a motion detector such as an infrared detector or photoelectric sensor; the type of sensor can of course be varied, and substituted with other technologies both presently available and subsequently available, while adhering to the principles of the present invention. If the pet remains less than a predetermined time, presumably an amount not sufficient for the animal to eliminate, the sensor does not signal the control unit to initiate the disposal cycle, preventing waste of unused housebreaking pads. When the dog leaves after the minimum predetermined time, the sensor signals the control unit 240 to initiate the disposal cycle and the control unit 240 then signals the motor to move through a series of cams and gears to drive the various assemblies as described hereinbelow. Motor driven cams and gears are well known to those of ordinary skill and details of possible configurations within the inventive concept are beyond the scope of this discussion.

Referring to FIG. 7, when the disposal cycle is initiated the motor drives the arbor 134, causing the arbor 134 to rotate, pulling the plastic wrap 40 and housekeeping pads 30 toward the arbor 134, passing under the guide bar 112 that unites them and seals them together, forming the composite pad 50 that continues to move forward wrapping around the arbor 134. The motor stops the arbor 134 rotation at a predetermined time sufficient to replace the soiled housekeeping pad with a clean housekeeping pad 30 from the pack stored in the loading drawer 232, ending a cycle.

When the pet owner wishes to dispose of the roll 52 of composite pads 50 or when a maximum number of cycles has been reached, the pet owner rotates the cowling 120 into the open position. The pet owner grabs the cutter 144 and traverses the composite pad 50, slicing the composite pad, forming a new leading edge on the pad on the stage portion 200 and separating the composite pads 50 on the arbor 134 from the pads on the stage portion 200. The pet owner grabs the scraper plate 176 by the handle 182 and pulls it toward the free end 134F of the arbor, removing the composite pad 50 from the arbor 134F. The pet owner disposes of the composite pad 50 and pushes the scraper plate back 176 towards the arbor assembly housing 132. The restart button on the control unit 240 is selected and the arbor 134 and housing 132 move along the slide assembly 150 approaching the back end 214 of the stage portion 200. The pet owner grabs the new leading edge of the composite pad 50 and places it in the slot 136 on the arbor 134 and engages the compression spring to hold it in place. The pet owner rotates the cowling 120 into the closed position. The pet owner selects jog start or automatic cycle on the control unit 240 and the apparatus 20 is ready for the pet to use.

If the pet owner selected the jog start, the pet owner must reset the apparatus 20 before the pet's next use by removing the composite pad 50 and selecting the restart button on the control unit 240. If the pet owner selects the automatic cycle, the apparatus 20 continues with a plurality of cycles, the maximum diameter of the roll 52 on the arbor 134 fitting inside the repository portion 100 limiting the number of cycles.

Referring to FIG. 3, when the housebreaking pad pack is exhausted, the pet owner installs a new pack 32 by opening the loading drawer 232 and placing a fresh pack 32 inside. The pet owner grabs the leading edge 30E of the pack 32 through the portal 222 on the front portion 220 of the cover assembly 210. Referring to FIG. 5, the pet owner feeds it through the slot 204 between the front portion 220 and pad stage 202. The pet owner resets the arbor 134 adjacent to the back end 214 of the stage portion 200 if necessary by selecting the restart button. The pet owner opens the cowling 120, releases the compression spring and feeds the front edge of the pack 32 under the guide bar 112 and into the slot 136 on the arbor 134, aligning the edges of the plastic wrap with the housebreaking pad 30 when placing the wrap and pad in the slot 136, making sure the scraper plate 176 is adjacent to the housing 132. The pet owner closes the compression spring and rotates the cowling 120 into the closed position. The pet owner selects automatic cycle or jog cycle on the control unit and the apparatus 20 operates as described hereinabove.

In conclusion, herein is presented an apparatus that senses when a pet is using a housebreaking pad, and when the pet is finished, removes and seals the pad and the waste automatically into a repository for later disposal and replaces the soiled pad with a clean pad. The invention is illustrated by example in the drawing figures, and throughout the written description. It should be understood that numerous variations are possible, while adhering to the inventive concept. Such variations are contemplated as being a part of the present invention.

What is claimed is:

1. An apparatus having a cycle for automatically removing and sealing a soiled housebreaking pad containing pet waste and replacing the soiled pad with a clean pad, minimizing the odor from the soiled housebreaking pad, comprising:

a stage portion having a pad stage, the housebreaking pad set on the pad stage, the stage portion having a loading drawer assembly, the loading drawer assembly holding a pack of housebreaking pads to supply the pad stage, the stage portion having a means for determining when pet waste is on the housebreaking pad to initiate the cycle, the stage portion having a back end with a guide bar, the guide bar spanning the back end of the stage portion, the housebreaking pad inserted under the guide bar;

a repository portion attached to the stage portion, the repository portion having a film dispensing assembly and an arbor assembly, the film dispensing assembly holding a roll of plastic film, the plastic film inserted under the guide bar and edgewise aligned with and clinging to the soiled housebreaking pad, sealing the pad and the pet waste forming a composite pad, the arbor assembly having an arbor, a compression spring and a housing with a motor, the arbor mounted on the housing and rotated by the motor, the arbor have a longitudinal slot, the composite pad inserted in the slot, the rotation of the arbor winding the composite pad around the arbor forming a roll held on the arbor by the compression spring and pulling the clean pad from the drawer assembly, setting the clean pad on the pad stage;

a scraper plate, the scraper plate having a bore and a top handle, the arbor fitting inside the bore of the scraper plate, the arbor have a pair of ends, a first end attached to the housing and a free end, the scraper plate sitting at the first end before the pad is attached to the arbor, the roll of composite pads on the arbor removed by releasing the compression spring and the scraper plate being pulled along the arbor by the handle towards the free end of the arbor, pushing the roll off the arbor;

a means for removing the roll of composite pads on the arbor for disposal; and a control unit, the control unit initiating rotation of the arbor in response to detecting pet waste on the housebreaking pad, the arbor winding the sealed composite pad onto the arbor and pulling the clean pad onto the pad stage, minimizing the odor from the pet waste on the pad.

2. The apparatus as described in claim 1, wherein the scraper plate with the bore and the top handle is included in a scraper assembly, the scraper assembly having, a guide plate and a track, the respository portion having a back panel with a top, the track attaching to the top of the back panel of the repository portion, the arbor fitting inside the bore of the scraper plate, the arbor have a pair of ends, a first end attached to the housing and a free end, the scraper plate sitting at the first end before the pad is attached to the arbor, the guide plate attaching to the scraper plate at a right angle and fitting inside the track on the back panel, the roll of composite pads on the arbor removed by releasing the compression spring and the scraper plate being pulled along the arbor by the handle towards the free end of the arbor, pushing the roll off the arbor.

3. An apparatus having a cycle for automatically removing and sealing a soiled housebreaking pad containing pet waste and replacing the soiled pad with a clean pad, minimizing the odor from the soiled housebreaking pad, comprising:

a stage portion having a pad stage, the housebreaking pad set on the pad stage, the stage portion having a loading drawer assembly, the loading drawer assembly holding a pack of housebreaking pads to supply the pad stage, the stage portion having a means for determining when pet waste is on the housebreaking pad to initiate the cycle, the stage portion having a back end with a guide bar, the guide bar spanning the back end of the stage portion, the housebreaking pad inserted under the guide bar;

a repository portion attached to the stage portion, the repository portion having a film dispensing assembly and an arbor assembly, the film dispensing assembly holding a roll of plastic film, the plastic film inserted under the guide bar and edgewise aligned with and clinging to the soiled housebreaking pad, sealing the pad and the pet waste forming a composite pad, the arbor assembly having an arbor, a compression spring and a housing with a motor, the arbor mounted on the housing and rotated by the motor, the arbor have a longitudinal slot, the composite pad inserted in the slot, the rotation of the arbor winding the composite pad around the arbor forming a roll held on the arbor by the compression spring and pulling the clean pad from the drawer assembly, setting the clean pad on the pad stage, the arbor assembly mounting on a slat having a pair of slotted ends, the repository portion having a back panel, a pair of short sides each with a bottom and a slide assembly driven by the motor creating a space for the arbor assembly, the slide assembly connecting the back panel of the repository portion and the back end of the stage portion, the slide assembly attached to the bottom of the short sides of the repository portion, the slide assembly having a shaft and a pair of railings, each having a track, the slotted ends of the slat with the attached arbor assembly inserted into the tracks of the railings, the slide assembly moving the slat away from the back end of the stage portion, extending the space as the composite pad roll increases diametrally as the cycle of removing, sealing and replacing the housebreaking pad repeats, the space increasing to accommodate the roll;

a means for separating the roll of composite pads on the arbor from the composite pad at the guide bar;

a means for removing the roll of composite pads on the arbor for disposal; and a control unit, the control unit initiating rotation of the arbor in response to detecting pet waste on the housebreaking pad, the arbor winding the sealed composite pad onto the arbor and pulling the clean pad onto the pad stage, minimizing the odor from the pet waste on the pad.

4. The apparatus as described in claim 3, wherein the control unit allows a user to select from the group of automatic cycle options consisting of a single cycle and a plurality of cycles, a maximum number of cycles determined by the composite pad roll having a diameter, the diameter increasing with each cycle to a maximum that the space extended by slide mechanism moving the arbor assembly away from the back end of the stage portion accommodates.

5. An apparatus having a cycle for automatically removing and sealing a soiled housebreaking pad containing pet waste and replacing the soiled pad with a clean pad, minimizing the odor from the soiled housebreaking pad, comprising:

a stage portion having a pad stage, the housebreaking pad set on the pad stage, the stage portion having a loading drawer assembly, the loading drawer assembly holding a pack of housebreaking pads to supply the pad stage, the stage portion having a sensor that detects a pet is present on the housebreaking pad for a predetermined amount of time sufficient for the pet to eliminate for determining when pet waste is on the housebreaking pad to initiate the cycle, the stage portion having a back end with a guide bar, the guide bar spanning the back end of the stage portion, the housebreaking pad inserted under the guide bar;

a repository portion attached to the stage portion, the repository portion having a film dispensing assembly, an arbor assembly, a cutter assembly and a scraper plate, the film dispensing assembly holding a roll of plastic film, the plastic film inserted under the guide bar and edgewise aligned with and clinging to the soiled housebreaking pad, sealing the pad and the pet waste forming a composite pad, the arbor assembly having an arbor, a compression spring and a housing with a motor, the arbor mounted on the housing and rotated by the motor, the arbor have a longitudinal slot, the composite pad inserted in the slot, the rotation of the arbor winding the composite pad around the arbor forming a roll held on the arbor by the compression spring and pulling the clean pad from the drawer assembly, setting the clean pad on the pad stage, the cutter assembly slidably attached to the guide bar, the cutter assembly having a guide wire and a cutter, the cutter having a handle with a slit and a protected blade inside the slit, the cutter on the guide wire, the guide wire guiding the cutter, the cutter traversing the composite pad, slicing the composite pad at the guide bar, separating the roll of composite pads on the arbor from the composite pad at the guide bar, the scraper plate having a bore and a top handle, the arbor fitting inside the bore of the scraper plate, the arbor have a pair of ends, a first end attached to the housing and a free end, the scraper plate sitting at the first end before the pad is attached to the arbor, the roll of composite pads on the arbor removed by releasing the compression spring and the scraper plate being pulled along the arbor by the handle towards the free end of the arbor, pushing the composite roll off the arbor for disposal; and a control unit, the control unit initiating rotation of the arbor in response to detecting pet waste on the housebreaking pad, the arbor winding the sealed composite pad onto the arbor and pulling the clean pad onto the pad stage, minimizing the odor from the pet waste on the pad.

6. The apparatus as described in claim 5, wherein the plastic film is selected from the group of polymer films consisting of polyvinylidene chloride, polyvinylindene chloride copolymer and polyethylene.

7. The apparatus as described in claim 5, wherein the guide wire guiding the cutter is powered by a cutting motor.

8. The apparatus as described in claim 5, wherein the repository portion has a scraper assembly, the scraper assembly having the scraper plate with the bore and the top handle, a guide plate and a track, the respository portion having a back panel with a top, the track attaching to the top of the back panel of the repository portion, the arbor fitting inside the bore of the scraper plate, the arbor have a pair of ends, a first end attached to the housing and a free end, the scraper plate sitting at the first end before the pad is attached to the arbor, the guide plate attaching to the scraper plate at a right angle and fitting inside the track on the back panel, the roll of composite pads on the arbor removed by releasing the compression spring and the scraper plate being pulled along the arbor by the handle towards the free end of the arbor, guided by the guide plate in the track, pushing the roll off the arbor.

9. The apparatus as described in claim 5, further having a cowling assembly for selectively covering the repository section to hide the soiled housebreaking assembly, the cowling assembly having a cowling frame and a cowling, the cowling frame attached to the back end of the stage portion, the cowling having a pair of sides with a panel between the sides, the cowling connected to the cowling frame by a pair of hinges, one hinge on each side of the cowling, the cowling rotating on the hinges to an open position for loading the plastic film roll and for removing the composite pad roll and rotating to a closed position for operating the apparatus.

10. The apparatus as described in claim 5, wherein the arbor assembly is mounted on a slat having a pair of slotted ends, the repository portion having a back panel, a pair of short sides each with a bottom and a slide assembly driven by the motor creating a space for the arbor assembly, the slide assembly connecting the back panel of the repository portion and the back end of the stage portion, the slide assembly attached to the bottom of the short sides of the repository portion, the slide assembly having a shaft and a pair of railings, each having a track, the slotted ends of the slat with the attached arbor assembly inserted into the tracks of the railings, the slide assembly moving the slat away from the back end of the stage portion, extending the space as the composite pad roll increases diametrally as the cycle of removing, sealing and replacing the housebreaking pad repeats, the space increasing to accommodate the roll.

11. The apparatus as described in claim 10, wherein the control unit allows a user to select from the group of automatic cycle options consisting of a single cycle and a plurality of cycles, a maximum number of cycles determined by the composite pad roll having a diameter, the diameter increasing with each cycle to a maximum that the space extended by slide mechanism moving the arbor assembly away from the back end of the stage portion accommodates.

* * * * *